(12) United States Patent
Venema et al.

(10) Patent No.: US 11,136,700 B2
(45) Date of Patent: Oct. 5, 2021

(54) PROCESS FOR PRODUCING NONWOVEN

(71) Applicant: Essity Hygiene and Health Aktiebolag, Gothenburg (SE)

(72) Inventors: Arie Venema, Suameer (NL); Gaatze Wijbenga, Suameer (NL); Hannu Ahoniemi, Gothenburg (SE); Mikael Strandqvist, Gothenburg (SE)

(73) Assignee: Essity Hygiene and Health Aktiebolag, Gothenburg (SE)

( * ) Notice: Subject to any disclaimer, the term of this patent is extended or adjusted under 35 U.S.C. 154(b) by 4 days.

(21) Appl. No.: 16/326,827

(22) PCT Filed: Sep. 1, 2016

(86) PCT No.: PCT/EP2016/070627
§ 371 (c)(1),
(2) Date: Feb. 20, 2019

(87) PCT Pub. No.: WO2018/041356
PCT Pub. Date: Mar. 8, 2018

(65) Prior Publication Data
US 2019/0226133 A1    Jul. 25, 2019

(51) Int. Cl.
*D04H 5/03*       (2012.01)
*D04H 18/04*      (2012.01)
(Continued)

(52) U.S. Cl.
CPC .............. *D04H 5/03* (2013.01); *B08B 1/006* (2013.01); *B32B 5/022* (2013.01); *B32B 5/26* (2013.01);
(Continued)

(58) Field of Classification Search
CPC ........ D21F 11/002; D21F 11/00; D21F 11/04; B32B 5/26; B32B 2250/20; B32B 5/022;
(Continued)

(56) References Cited

U.S. PATENT DOCUMENTS

| 4,443,297 A * | 4/1984 | Cheshire | D21F 11/002 162/101 |
| 5,853,538 A * | 12/1998 | Reiner | D21F 11/002 162/101 |

(Continued)

FOREIGN PATENT DOCUMENTS

| CA | 841938 A  * | 5/1970 |  |
| CA | 3034510 A1 * | 3/2018 | D21F 11/04 |

(Continued)

OTHER PUBLICATIONS

European Patent Office, International Search Report and Written Opinion issued in corresponding PCT Application No. PCT/E02016/070627, dated Apr. 26, 2017 (12 pages).

(Continued)

*Primary Examiner* — Jose A Fortuna
(74) *Attorney, Agent, or Firm* — Wood Herron & Evans LLP

(57) ABSTRACT

A process for producing nonwoven materials is provided. The process includes: providing a three-phase (gas-liquid-solid) suspension, providing a first moving carrier sieve, applying the three-phase suspension onto the first moving carrier sieve to produce a fibrous web, removing aqueous residue of the three-phase suspension through the first carrier sieve, recycling the aqueous residue, pre-integrating the fibrous web by flushing the web with water and collecting flushed water, transferring the pre-integrated fibrous web from the first moving carrier sieve to a second moving carrier sieve, and hydroentangling the fibrous web. The three-phase suspension contains natural and/or manmade fibres, a surfactant, and air.

18 Claims, 2 Drawing Sheets

(51) Int. Cl.
| | |
|---|---|
| *D04H 3/11* | (2012.01) |
| *B08B 1/00* | (2006.01) |
| *B32B 5/02* | (2006.01) |
| *B32B 5/26* | (2006.01) |
| *D04H 5/08* | (2012.01) |
| *D21F 11/04* | (2006.01) |
| *D21H 13/10* | (2006.01) |
| *D21H 25/00* | (2006.01) |

(52) U.S. Cl.
CPC ............... *D04H 3/11* (2013.01); *D04H 5/08* (2013.01); *D04H 18/04* (2013.01); *D21F 11/04* (2013.01); *D21H 13/10* (2013.01); *D21H 25/005* (2013.01); *B32B 2250/20* (2013.01); *B32B 2262/0253* (2013.01); *B32B 2262/0276* (2013.01); *B32B 2262/04* (2013.01); *B32B 2432/00* (2013.01); *D10B 2201/01* (2013.01); *D10B 2321/022* (2013.01); *D10B 2331/04* (2013.01); *D10B 2503/00* (2013.01)

(58) Field of Classification Search
CPC .... B32B 2262/0253; B32B 2262/0276; B32B 2262/04; B32B 2432/00; B32B 2262/067; D21H 13/10; D21H 21/24; D21H 25/005; D04H 5/03; D04H 3/11; D04H 1/492; D04H 5/08; D04H 18/04; Y10T 442/689; Y10T 442/681; B08B 1/006
See application file for complete search history.

(56) References Cited

U.S. PATENT DOCUMENTS

| | | | | |
|---|---|---|---|---|
| 6,103,060 | A | 8/2000 | Munerelle et al. | |
| 6,592,713 | B2* | 7/2003 | Ahoniemi | D04H 3/02 162/103 |
| 7,326,318 | B2* | 2/2008 | Strandqvist | D21F 1/0063 162/101 |
| 7,331,091 | B2* | 2/2008 | Strandqvist | D04H 5/02 28/104 |
| 7,406,755 | B2* | 8/2008 | Putnam | D04H 3/11 156/148 |
| 7,432,219 | B2* | 10/2008 | Strandqvist | D04H 5/03 442/401 |
| 7,998,889 | B2* | 8/2011 | Stralin | D04H 5/02 442/408 |
| 8,389,427 | B2* | 3/2013 | Gustafsson | B32B 5/26 442/402 |
| 8,763,219 | B2* | 7/2014 | Jonsson | D04H 1/4374 28/104 |
| 9,840,794 | B2* | 12/2017 | Seidel | D04H 1/732 |
| 10,435,826 | B2* | 10/2019 | Strandqvist | D21H 5/2685 |
| 10,857,756 | B2* | 12/2020 | Pratt | D04H 1/498 |
| 11,015,292 | B2* | 5/2021 | Venema | D21F 1/66 |
| 2002/0088099 | A1* | 7/2002 | Ahoniemi | D04H 3/14 28/103 |
| 2005/0022954 | A1* | 2/2005 | Strandqvist | D21F 11/00 162/115 |
| 2005/0064099 | A1* | 3/2005 | Berenstain | D06B 11/0056 427/258 |
| 2005/0112980 | A1* | 5/2005 | Strandqvist | D04H 5/03 442/416 |
| 2007/0010156 | A1* | 1/2007 | Strandqvist | D04H 5/03 442/408 |
| 2015/0083354 | A1* | 3/2015 | Strandqvist | B32B 5/022 162/146 |
| 2018/0355527 | A1* | 12/2018 | Strandqvist | D21H 27/36 |
| 2018/0363182 | A1* | 12/2018 | Bergmann | D04H 1/541 |
| 2019/0177915 | A1* | 6/2019 | Venema | D21F 1/66 |
| 2019/0226133 | A1* | 7/2019 | Venema | B32B 5/022 |
| 2019/0232604 | A1* | 8/2019 | Pratt | C11D 17/042 |
| 2020/0190446 | A1* | 6/2020 | Sivik | C11D 3/3953 |
| 2021/0114341 | A1* | 4/2021 | Bogren | D04H 1/26 |
| 2021/0238804 | A1* | 8/2021 | Venema | D21H 15/02 |

FOREIGN PATENT DOCUMENTS

| | | | | |
|---|---|---|---|---|
| CN | 1127816 | A | | 7/1996 |
| CN | 1137585 | A | | 12/1996 |
| CN | 1245544 | A | | 2/2000 |
| CN | 1277644 | A | | 12/2000 |
| CN | 1277646 | A | | 12/2000 |
| EP | 0481745 | A1 | | 4/1992 |
| EP | 1735489 | B1 | | 9/2012 |
| EP | 3507408 | A1 | | 7/2019 |
| EP | 3507416 | A1 | | 7/2019 |
| GN | 1122389 | A | | 5/1996 |
| JP | 2002285466 | A | * | 10/2002 ............... D04H 5/03 |
| WO | 9602701 | A1 | | 2/1996 |
| WO | 9827276 | A1 | | 6/1998 |
| WO | WO-2005059218 | A1 | * | 6/2005 ............... D04H 5/03 |
| WO | 2005087997 | A1 | | 9/2005 |
| WO | 2010077929 | A1 | | 7/2010 |
| WO | 2013165287 | A1 | | 11/2013 |
| WO | WO-2016041773 | A1 | * | 3/2016 ............... D04H 1/492 |
| WO | 2018041355 | A1 | | 3/2018 |
| WO | 2018041356 | A1 | | 3/2018 |

OTHER PUBLICATIONS

Canadian Patent Office, Office Action issued in related CA Application No. 3,034,510, dated Dec. 23, 2019 (3 pages).
European Patent Office, Office Action issued in related EP Application No. 16 763 735.4-1102 dated Dec. 18, 2019 (4 pages).
European Patent Office, Search Report and Written Opinion issued in related PCT Application No. PCT/EP2016/070626, dated May 8, 2017 (10 pages).
Canadian Patent Office, Office Action issued in related CA Application No. 3,034,508, dated Feb. 18, 2020 (3 pages).
Chinese Patent Office, Office Action issued in related CN Application No. 201680088830.1, dated Mar. 2, 2020 and English Translation of same (16 pages).

\* cited by examiner

PROCESS FOR PRODUCING NONWOVEN

CROSS-REFERENCE TO RELATED APPLICATIONS

This application is a national stage application under 35 U.S.C. § 371 of International Application No. PCT/EP2016/070627, filed on Sep. 1, 2016, the disclosure of which is hereby incorporated by reference herein in its entirety.

TECHNICAL FIELD

The present disclosure relates to a process for producing a composite nonwoven sheet material and to a sheet material which is obtainable by such a process.

BACKGROUND

Absorbent nonwoven materials are used for wiping various types of spills and dirt in industrial, medical, office and household applications. They typically include a combination of thermoplastic polymers (synthetic fibres) and cellulosic pulp for absorbing both water and other hydrophilic substances, and hydrophobic substances (oils, fats). The nonwoven wipes of this type, in addition to having sufficient absorptive power, are at the same time strong, flexible and soft. They can be produced by wet-laying a pulp-containing mixture on a polymer web, followed by dewatering and hydroentangling to anchor the pulp onto the polymer and final drying. Absorbent nonwoven materials of this type and their production processes are disclosed in WO2005/042819.

WO99/22059 discloses a method of producing a nonwoven sheet material by providing melt-blown or spun-laid synthetic continuous filaments, applying thereon a foam of natural (pulp) fibres through a head box to produce a combination of synthetic filaments and natural fibres, followed by hydroentangling the combination using water jets, to produce a composite sheet material in which the filaments and the natural fibres are intimately integrated resulting in high strength and high stiffness sheet material. The hydroentanglement can be preceded by applying the foam also on the other side of the web.

WO96/02701 and WO96/02702 disclose a method of producing a hydroentangled nonwoven material by foam formation of a fibrous web, followed by spraying the foam-formed web with water for maintaining the water balance in the foam forming system, wherein foam formation and hydroentanglement are performed on the same belt (wire). The foam contains 49-54 vol. % of air.

WO2012/150902 discloses a method of producing a hydroentangled nonwoven material wherein a first fibrous web of synthetic staple fibres and natural (pulp) fibres is wet-laid and hydroentangled using relatively low pressures of 10-50 bar, spun-laid filaments are laid on top of the hydroentangled first fibrous web and a second fibrous web of natural fibres is wet-laid on top of the filaments and subsequently hydroentangled. The web is then reversed and subjected to a third hydroentangling treatment at the side of the first fibrous web, to produce a strong composite sheet material having essentially identical front and back sides.

Desirable results in terms of flexibility, sheet strength, and absorption capacity are obtained when the fibrous web is produced by applying the fibres in the form of a foam containing a surfactant, onto the synthetic fibres, and bonding the combined pulp fibres and synthetic fibres by hydroentanglement. However, surface irregularities or even thin spots or holes in the final sheet material may result, which negatively affect the sheet properties and performances as well as its appearance. This problem could be reduced by using relatively high levels of air in the foam, but this requires high levels of surfactant in the foam, and high levels of surfactant may hamper the hydroentangling process, resulting in suboptimum bonding in the nonwoven product and potential clogging in the backwater system.

Depending on the constitution of the foam-formed web, different amounts of surfactant escape from the foam loop. Thus, e.g. high pulp contents, thick precursor web and coarse or stiff filaments result in greater losses of foam forming liquid and hence in greater loss of surfactant. Pre-entanglement using high pressures could compensate liquid losses, but have the risk of entangling the sheet into to the supporting conveyor belt, making transfer to the next, less permeable belt, needed for optimum hydroentanglement, difficult.

Thus there is a need for a process of producing hydroentangled nonwoven materials which avoids the drawbacks of irregular or defective surface characteristics and excessive use of surfactants.

SUMMARY

It is desired to provide a hydroentangled, absorbent nonwoven material having a desired strength, and limited levels of surfactants.

It is also desired to provide a process for producing such nonwoven materials which involves the step of pre-integrating a foam-laid fibrous web using water jets flushing the web prior to hydroentanglement. The pre-integration will reduce the level of surfactant thus allowing more effective hydroentanglement and also partly integrate the components of the web, in particular the fibrous web and the polymer, avoiding difficulties with belt transfer and simultaneously compensating for water losses in the foam loop.

BRIEF DESCRIPTION OF THE DRAWINGS

The accompanying FIGS. 1 and 2 diagrammatically depict an installation for producing absorbent pulp-containing nonwoven sheet material of the present disclosure.

DETAILED DESCRIPTION OF PARTICULAR EMBODIMENTS

Figure 1:
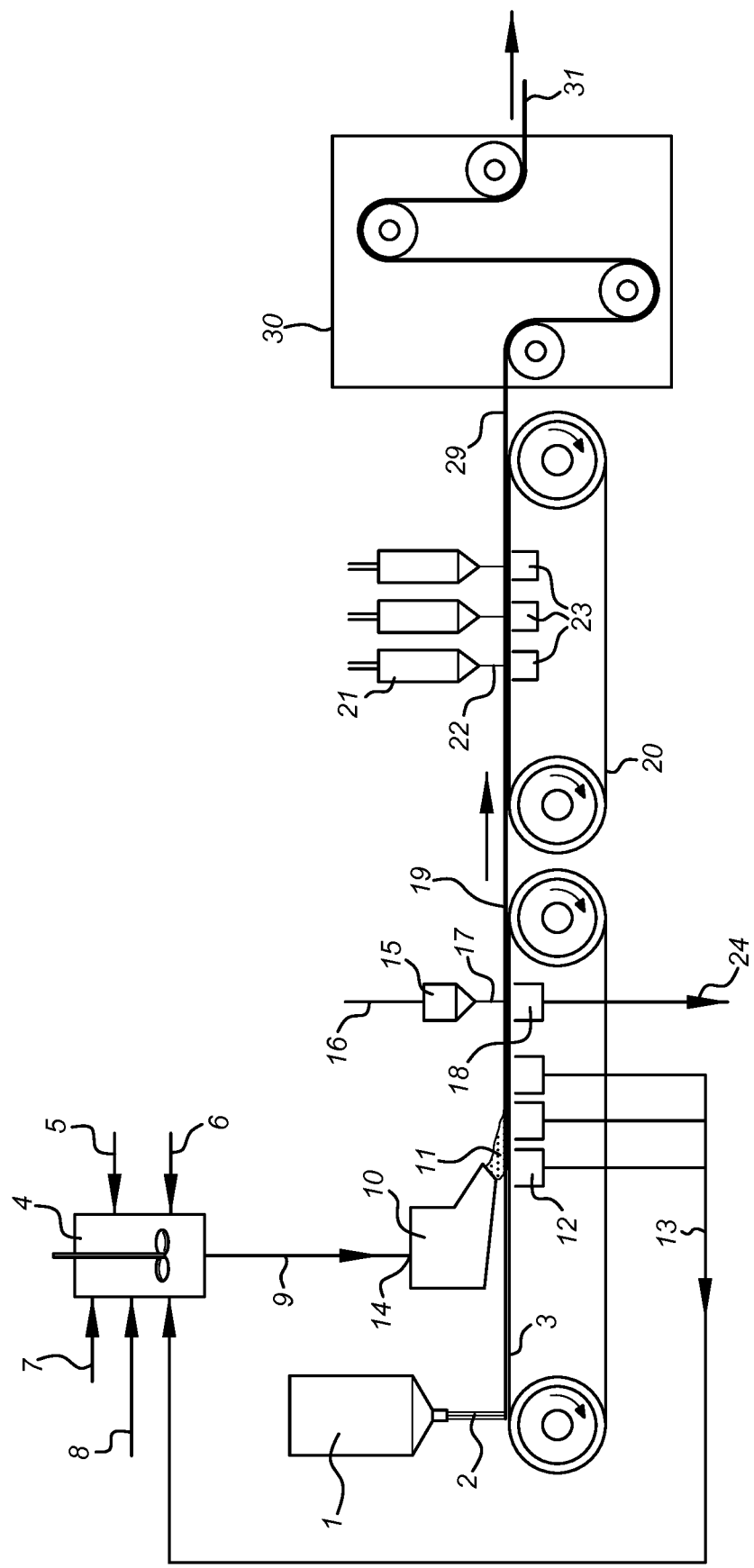

Embodiments of the invention pertain to processes of producing hydroentangled nonwoven materials. Further embodiments of the invention pertain to hydroentangled nonwoven materials obtainable by such processes.

The present process of producing a hydroentangled nonwoven sheet material includes the following steps:
a) providing a three-phase (gas-liquid-solid) suspension containing:
   natural and/or manmade fibres;
   a surfactant;
   20-48 vol. % of air,
b) providing a first moving carrier sieve and optionally laying a polymer web onto the first moving carrier sieve,
c) applying the three-phase suspension onto the first moving carrier sieve or onto the polymer web, to produce a fibrous web,
d) collecting and removing aqueous residue of the three-phase suspension through the first carrier sieve,
e) recycling aqueous residue to step a), f) pre-integrating the fibrous web, by flushing the web with 0.0005-0.05 m³ of water per m³ of applied three-phase suspension, at a pressure of 5-50 bar, and collecting flushed water, g) transferring the pre-integrated fibrous web from said first moving carrier sieve to a second moving carrier sieve, said second moving carrier sieve having a porosity which is smaller than the porosity of said first moving carrier sieve, h) hydroentangling the fibrous web on said second moving carrier, i) (optionally) drying the hydroentangled web, j) (optionally) further processing and finalising the web to produce the nonwoven end material.

In particular embodiments, the pre-integration of step f) is performed by applying water jets perpendicularly onto the formed web at relative low pressures of e.g. 2-60 bar, 5-50 bar, 5-25 bar, or 5-10 bar. The jets can cover the full width of the web forming the final sheet, and hence also about the whole width of the moving carrier sieve. The jets are advantageously placed at mutual distances of between 0.4 and 2 mm, or between 0.5 and 1 mm and may thus form a "curtain" of flushing water. In particular embodiments, the amount of pre-integration water is between 0.001 and 0.03 m³ of water per m³ of the applied three-phase suspension, between 0.002 and 0.02, or between 0.003 and 0.01 or even between 0.004 and 0.008 m³ of water per m³ of suspension. Alternatively, the amount of water applied in step f) can be independently defined relative to the formed sheet material (dry weight), or in absolute terms, i.e. the amount applied per time unit. When expressed in relation to the formed sheet material, the amount of water applied in step f) can be between 0.8 and 20 litres of water per kg of formed sheet material, or between 1 and 10 l/kg, or between 1.2 and 5, or even between 1.5 and 3 l/kg of formed sheet material. When expressed in absolute terms, the amount of water applied in step f) can be between 10 and 250 litres of water per min per m width of formed web (=0.6-15 m³/h/m) or between 13 and 170 l/min·m (0.8-10 m³/h/m), or between 17 and 50 l/min·m (1-3 m³/h/m), or even between 20 and 33 l/min·m (1.2-2 m³/h/m).

In a particular embodiment, water used for the pre-integration is fresh water, having low dissolved matter levels, e.g. a TDS (total dissolved solids) less than 5 g/l, or even less than 1 g/l, and is substantially neutral (e.g. pH between 5.5 and 8.5). Part of the water can be supplied by recycling flushed water collected in step f), optionally after (micro)filtration. In an embodiment, part of the collected flushed water is fed to the aqueous suspension in step a), i.e. in parallel with step e), and the remainder of the collected aqueous residue is recycled to the pre-integration step f).

The pre-integrating and collecting step f) may be carried out in multiple stages, e.g. two stages f1) and f2), or even three stages f1), f2), f3), or even more stages, using multiple series of water jets, each series covering the entire width of the web forming the sheet material. In the event of multiple pre-integration stages, it may be advantageous to recycle flushed water collected from the first stage f1), which will contain relatively high levels of surfactant, to the three-phase (foam) suspension in step a) and at least a part of the flushed water collected from the second or last stage f2), which will contain lower levels of surfactant, to the first pre-integration step f1). The more specific distribution of collected flushed water to the suspension-forming stage and to the pre-integration, can be chosen so as to have optimum quality of the suspension and the pre-integrating water in combination with minimum use of raw materials, including water and surfactant.

The wet-laying suspension is provided and applied as a foam, which is obtained by introducing air (or another inert gas) into the suspension. The suspension (foam) may contain between 12 and 48 vol. % of air, between 20 and 40 vol. % of air, or between 24 and 39 vol. % of air. When using a foam, the residue collected after applying the foam onto the web will also have the form of a foam.

The three-phase suspension can contain a surfactant as further described below. Suitable levels of surfactant may be between 0.01 and 0.2 wt. %, or between 0.02 and 0.1 wt. %. As a result of the pre-integration step, the residual level of surfactant in the final product will be very low, for example less than 100 ppm of the surfactant, less than 50 ppm, or less than 25 ppm of the surfactant (dry weight basis).

In particular embodiments, the step of applying the three-phase suspension (foam) (step c)) involves the use of a head box for distributing the foam onto the moving carrier, and the step of removing aqueous residue through the first carrier (step d)) involves the use of a suction box, which may be divided into multiple compartments, e.g. 2-5 compartments, which can be arranged consecutively along the direction of movement of the carrier, as shown in the figures and explained in more detail below.

It may also be advantageous when the step of applying the three-phase suspension c) and the step of removing aqueous residue d) are carried out in at least two separate stages c1), d1) and c2), d2). Each step of applying suspension then involves the use of a head box and each removing step can involve a set of suction boxes. This will further reduce the required levels of surfactant and will result in a more even sheet product with less surface deficiencies. In that embodiment, the pre-integrating step may be performed before or after the second (or last) suspension-laying or foam-laying stage. However, in particular embodiments, the pre-integrating and collecting step f) is carried out after the second or last application and removing stage c2), d2). It is also possible to apply two pre-integrating and collecting stages when using two suspension-laying stages. The order can then be suspension-laying (c1, d1)—suspension-laying (c2, d2)—pre-integration (f1)—pre-integration (f2), or, alternatively, suspension-laying (c1, d1)—pre-integration (f1)—suspension-laying (c2, d2)—pre-integration (f2), Thus, the first pre-integrating and collecting stage f1) can be carried out before the second or last applying and removing stage c2, d2)) and the second or last pre-integrating and collecting stage f2) is carried out after the second or last applying and removing stage c2, d2).

It was found to be advantageous to subject the aqueous residue removed in step d)—thus containing air—to phase separation, in particular water-air separation, before being recycled in step e). The optional phase separation of the aqueous residue involves reducing the air content of the aqueous residue (spent web-forming suspension). In particular embodiments, the air content is reduced to below 20 vol. %, below 15 vol. %, or below 10 vol. %, allowing easy pumpability of the aqueous residue. This can be achieved by removing and collecting the aqueous residue through the carrier by means of suction, using a suction box which can be divided in multiple compartments, e.g. 2-6 compartments arranged along the direction of movement of the carrier, and the residue collected in each compartment can be conveyed to a distinct phase separation tank. The low pressure in the headspace of the separation tanks reduces the air content of the aqueous residue. The deaeration is further enhanced by breaking the foam, e.g. by introducing turbulence by means of a fan or by spraying with water. After recycling the deaerated aqueous residue by pumping and entering the foam-producing step a), the air content is restored to the required level, in particular to between 20 and 40 vol. %.

In an embodiment, the present process includes a further step, after step b), of depositing a polymer web, which contains at least 50 wt. % of synthetic filaments, in a way known as such in the art, e.g. by a spun-laid, air-laid or carding process step, and further illustrated below. In another embodiment, the present process includes an optional step of depositing a polymer layer on the deposited (combined) fibrous web after step c). After the deposition of the fibrous web (containing short fibres) and the polymer web of this embodiment, the combined web can contain between 10 and 60 wt. %, or between 15 and 45 wt. % of the synthetic filaments on dry matter basis of the combined web.

A further step of the present process is step h) of hydroentangling the formed fibrous web, as such, or combined with a synthetic continuous filament layer, and thus integrating the web using by high-pressure water jets. In particular embodiments, hydroentangling is performed on a different moving carrier sieve from the carrier on which the fibrous web is laid. The hydro-entanglement can involve the use of needle-like water jets covering the width of the running web. In certain embodiments, the hydroentangling step (or steps) is performed on a different carrier (running wire), which is more dense (smaller sieve openings) than the carrier on which the fibre-containing suspensions (and optionally first the polymer web) are deposited. In more certain embodiments, the hydroentangling step includes multiple hydroentanglement jets shortly sequencing each other. The pressure applied may be in the order of 20-200 bar. The total energy supply in the hydroentangling may step be in the order of 100-400 kWh per ton of the treated material, measured and calculated as described in CA 841938, pages 11-12.

The natural and/or manmade fibres in the three-phase suspension include short fibres that may have lengths from 1 to 25 mm, and the short fibres can comprise at least 25 wt. %, or 50-90 wt. % of cellulosic pulp fibres, which can have fibre lengths of between 1 and 5 mm.

Particular compositions of the fibres of the aqueous suspension are described below.

The sheet material as produced by the present process can contain 40-80 wt. %, or 50-75 wt. %, of pulp fibres and 15-60 wt. %, or 25-50 wt. %, of thermoplastic fibres.

The process of the present disclosure can be a high-speed wet-laying process, in which the three-phase suspension can be deposited in step b) at a rate of between 2.1 and 6.0 m$^3$/min (35-100 l/sec; 126-360 m$^3$/h) for a formed web having a width of 1 m. This corresponds to depositing about 5-25 kg fibres per min (and per m width) or 6-18 kg fibres per min and per m, and to a carrier sieve running speed of 1-8 m/sec, or 2.5-6 m/sec. Such speed values suitable combine with the amounts of pre-integration water used in step f), whether expressed per time unit, or in volume per volume of suspension, or in volume per weight of formed sheet material in any combination thereof.

The various steps of the process are typically carried out on endless moving wires (carrier sieves: porous fabrics, capable of carrying the various stages of the forming web) and allowing surplus fluid to pass and be removed, e.g. by suction. In particular embodiments, the polymer-laying step b), suspension-applying step c) and pre-integrating step f) are carried out on a first moving wire having a first porosity, and hydroentangling step h) is carried out on a second moving wire having a second porosity which is lower than the first porosity. The permeability of the first moving carrier (wire) can be 250-750 cfm (cubic foot per min) (=7.1-21.2 m$^3$/min), or 400-600 cfm (=11.3-17.0 m$^3$/min), while the permeability of the second moving carrier can be 100-350 cfm (=2.8-9.9 m$^3$/min), or 150-250 cfm (=4.2-7.1 m$^3$/min).

The process according to the present disclosure may further include a step i) of drying the hydroentangled sheet and optional further steps of imprinting, conditioning, dimensioning and packaging the dried sheet to produce a ready-for-use sheet material.

In the present disclosure, the indications "between x and y" and "from x to y" and "of x-y" wherein x and y are numerals, are considered to be synonymous, the inclusion or exclusion of the precise end points x and y being of theoretical rather than practical meaning. Further details of particular embodiments of the various steps and materials to be applied are described below.

Polymer Web

Carrier and Polymer Web

A moving carrier sieve on which the aqueous composition can be applied, can be a forming fabric, which can be a running belt-like wire having at least the width of the sheet material to be produced, which fabric allows draining of liquid through the fabric, i.e. which is semipermeable. In an embodiment, a polymer web can first be deposited on the carrier by laying man-made fibres on the carrier. The fibres can be short or long distinct (staple) fibres and/or continuous filaments. The use or co-use of filaments is advantageous in certain embodiments. In another embodiment, a polymer layer can be deposited on the fibrous web obtained in steps b) and c), but before transfer step g), or even before pre-integration step f). It is also possible to first deposit a polymer layer, followed by depositing the aqueous suspension to form a fibrous web on the polymer web and to deposit a further polymer layer on the fibrous web.

Filaments are fibres that in proportion to their diameter are very long, in principle endless, during their production. They can be produced by melting and extruding a thermoplastic polymer through fine nozzles, followed by cooling, such as by using an air flow, and solidification into strands that can be treated by drawing, stretching or crimping. The filaments may be of a thermoplastic material having sufficient coherent properties to allow melting, drawing and stretching. Examples of useful synthetic polymers are polyolefins, such as polyethylene and polypropylene, polyamides such as nylon-6, polyesters such as poly(ethylene terephthalate), and polylactides. Copolymers of these polymers may of course also be used, as well as natural polymers with thermoplastic properties. Polypropylene is a particularly suitable thermoplastic man-made fibre. Fibre diameters can e.g. be in the order of 1-25 µm. Staple fibres can be of the same man-made materials as filaments, e.g. polyethylene, polypropylene, polyamides, polyesters, polylactides, cellulosic fibres, and can have lengths of e.g. 2-40 mm, or 5-25 mm. In particular embodiments, the polymer web contains at least 50 wt. % of thermoplastic (synthetic) filaments, or at least 75 wt. %, of synthetic filaments. The combined web contains between 15 and 45 wt. % of the synthetic filaments on dry solids basis of the combined web.

Three-Phase Fibre Suspension

The aqueous suspension is obtained by mixing short fibres and water in a mixing tank. The short fibres can include natural fibres, in particular cellulosic fibres. Among the suitable cellulosic fibres are seed or hair fibres, e g cotton, flax, and pulp. Wood pulp fibres are especially well suited, and both softwood fibres and hardwood fibres are suitable, and also recycled fibres can be used. The pulp fibre lengths can vary between 0.5 and 5, from 1 to 4 mm, or from around 3 mm for softwood fibres to around 1.2 mm for hardwood fibres and a mix of these lengths, or even shorter, for recycled fibres. The pulp can be introduced as such, i.e. as pre-produced pulp, e.g. supplied in sheet form, or produced in situ, in which case the mixing tank is commonly referred to as a pulper, which involves using high shear and possibly pulping chemicals, such as acid or alkali.

In addition or instead of the natural fibres, other natural or man-made materials can be added to the suspension, such as in particular other short fibres. Staple (man-made) fibres of variable length, e.g. 5-25 mm, can suitably be used as additional fibres. The staple fibre length may also be bimodal, one part having an average length 5-10 mm and another part having an average length of 15-20 mm. The staple fibres can be man-made fibres as described above, e.g. polyolefins, polyesters, polyamides, and poly(lactic acid), or cellulose derivatives such as lyocell. The staple fibres can be colourless, or coloured as desired, and can modify further properties of the pulp-containing suspension and of the final sheet product. Levels of additional, or only, (man-made) fibres, in particular staple fibres, can suitably be between 3 and 100 wt. %, between 5 and 50 wt. %, between 7 and 30 wt. %, or between 8 and 20 wt. % on the basis of the dry solids of the aqueous suspension.

When using polymer fibres as additional material, it is usually necessary to add a surfactant to the pulp-containing suspension. Suitable surfactants include anionic, cationic, non-ionic and amphoteric surfactants. Suitable examples of anionic surfactants include long-chain (Ic) (i.e. having an alkyl chain of at least 8 carbon atoms, in particular at least 12 carbon atoms) fatty acid salts, Ic alkyl sulfates, Ic alkylbenzenesulfonates, which are optionally ethoxylated. Examples of cationic surfactants include Ic alkyl ammonium salts. Suitable examples of non-ionic surfactants include ethoxylated Ic fatty alcohols, ethoxylated Ic alkyl amides, Ic alkyl glycosides, Ic fatty acid amides, mono- and diglycerides etc. Examples of amphoteric (zwitterionic) surfactants include Ic alkylammonio-alkanesulfonates and choline-based or phosphatidylamine-based surfactants. The level of surfactant (on the basis of the aqueous suspension) can be between 0.005 and 0.2, between 0.01 and 0.1, or between 0.02 and 0.08 wt. %.

For an effective application of the aqueous suspension the suspension contains air, i.e. it is a three-phase suspension used as a foam. The amount of air introduced into the suspension (e.g. by stirring the suspension) can be between 12 and 48 vol. % of the final suspension (including the air). The air content of the three-phase suspension can be between 20 and 40 vol. %, or between 24 and 39 vol. %. The more air is present in the foam, often the higher levels of surfactants are required. The term "air" is to be interpreted broadly as any non-noxious gas, typically containing at least 50% of molecular nitrogen, and further varying levels of molecular oxygen, carbon dioxide, noble gases etc. Further information about foam formation as such can be found e.g. in WO03/040469.

Application of the Fibre-Containing Suspension

The aqueous suspension containing short fibres is deposited on the carrier, either directly or on a polymer web, e.g. using a head box, which guides and spreads the suspension evenly over the width of the web in the direction of the running fabric, causing the suspension to partly penetrate into the polymer web. The fibre-containing suspension is applied at the running speed of the fabric (wire) and thus typically the speed is the same as the speed of laying the polymer web, which speed can be high, e.g. between 1 and 8 m/sec (60-480 m/min), especially between 3 and 5 m/sec. The total amount of liquid circulated by the wet-laying or foam-laying for a formed web having a width of 1 m can be in the order of 1200-5400 kg/min, 1800-4500 kg/min, or 2100-3600 kg/min (20-90, 30-75, or 35-60 kg/sec). The amount that is drained off via the web having a width of 1 m, i.e. the part that is not recycled, will be in the order of 20-57 kg/min of liquid (36-66 kg/min including solid material).

Removal of Aqueous Residue After the Application of the Suspension

Surplus liquid and gas phase are sucked through the web and the fabric leaving the short fibres in and on the web. The spent liquid and gas can be separated, processed and returned to the mixing tank for producing fresh pulp-containing suspension.

Optional Further Application of the Pulp-Containing Suspension

It may be suitable to apply the aqueous pulp-containing suspension onto the polymer web in at least two separate steps (c1 and c2) at the same side of the polymer web, using two head boxes. In particular embodiments, such two (or more) steps are separated by a suction step (d1) or by a suction step (d1) and a pre-integration step (f1) and also followed by a suction step (d2) and a pre-integration step (f2). This results in part of the solids of the suspension entering on and in the polymer web as a result of the application and subsequent (or virtually simultaneous) removal of surplus water and air, and consequently the remaining part(s) of the suspended solid to be even more evenly spread over the width of the web and be even more integrated in the web. The water content of the combined web before the second pulp application step can be up to 85 wt. %, up to 80 wt. %, or up to 60 and 75 wt. %. Thus, the dry solids content of the fibrous web after the first application step can be at least 15 wt. %, between 20 and 40 wt. %, or between 25 and 40 wt. %, or even between 25 and 30 wt. %.

The relative amounts of suspension (or of solids) applied in the first and second (and possibly third and further) steps can be equal, but, in certain embodiments, it can be applied to the suspension at slightly decreasing levels. Thus, between 25 and 75 wt. % of the aqueous suspension (on pulp basis) can be applied in a first step, between 15 and 60 wt. % of the aqueous suspension can be applied in a second step, and between 0 and 40 wt. % of the aqueous suspension can be applied in an optional third or further step. The composition of the pulp-containing suspensions in the first head box (first application) and second head box—and optional further head boxes—is particularly the same.

Pre-Integration

The pre-integrating step f) is performed as described above. Thus, the fibrous web is subjected to water jets, in particular at a level of 0.0005-0.05 $m^3$ of water per $m^3$ of applied three-phase suspension, or at corresponding levels based on the weight of sheet material produced, or on a time bases, as described above. The water jets can form a row of perpendicular (vertical) jets covering the width of the moving web and can have a pressure of 5-50 bar. The pre-integrating and collecting step f) may be carried out in multiple stages, e.g. two stages f1) and f2), or even three stages f1), f2), f3), or even more stages, using multiple series of water jets, each series covering the entire width of the web forming the sheet material.

Hydroentangling

Subsequently to the foam-laying and pre-integration steps, the combined web is subjected to hydro-entanglement, i.e. to needle-like water jets covering the width of the running web. In particular embodiments the hydroentangling step (or steps) are performed on a different fabric (running wire), which is more dense (smaller sieve openings) than the fabric on which the polymer web and the pulp-containing suspensions are applied. In more particular embodiments, the hydroentangling step includes multiple hydroentanglement jets shortly sequencing each other. The pressure applied may be in the order of 20-200 bar. The total energy supply in the hydroentangling step may be in the order of 100-400 kWh per ton of the treated material, measured and calculated as described in CA 841938, pages 11-12. The skilled person is aware of technical details of hydroentanglement, as described e.g. in CA 841938 and WO96/02701.

Drying

The combined, hydroentangled web can be dried, e.g. using further suction and/or oven drying at temperatures above 100° C., such as between 110 and 150° C.

Further Processing

The dried nonwoven can be further treated by adding additives, e.g. for enhanced strength, scent, printing, colouring, patterning, impregnating, wetting, cutting, folding, rolling, etc. as determined by the final use of the sheet material, such as in industry, medical care, household applications.

End Product

Also encompassed by the present disclosure is a hygiene and/or cleaning product including a conditioned, dimensioned, and optionally packaged sheet material produced by the process as described above. It may be used for wiping or cleaning in industrial, medical, office and household applications. The nonwoven sheet material as produced can have any shape, but frequently it will have the form of rectangular sheets of between less than 1 m up to several meters. Suitable examples include wipes of 40 cm×40 cm. Depending on the intended use it may have various thicknesses of e.g. between 100 and 2000 µm, in particular from 250 to 1000 µm. The thickness can be determined as described below. Along its cross section, the sheet material may be essentially homogenous, or it may gradually change from relatively pulp-rich at one surface to relatively pulp-depleted at the opposite surface (as a result of e.g. wet-laying or foam-laying pulp at one side of the polymer web only), or, alternatively, from relatively pulp-rich at both surfaces to relatively pulp-depleted in the centre (as a result of e.g. wet-laying or foam-laying pulp at both sides of the polymer web—either or both in multiple steps at the same side). In a particular embodiment, the nonwoven material as produced has front and back surfaces of different composition, in that the pulp-containing suspension is applied at the same side in each separate step, and/or hydroentanglement is performed only at one side. Other structures are equally feasible.

The composition can also vary rather within broad ranges. As an advantageous example, the sheet material may contain between 25 and 85 wt. % of (cellulosic) pulp, and between 15 and 75 wt. %, 15-60 wt. %, or 25-50 wt. %, of man-made (non-cellulosic) polymer material, whether as (semi)continuous filaments or as relatively short (staple) fibres, or both. In a more detailed example, the sheet material may contain between 40 and 80 wt. % of pulp, or 50-75 wt. % of pulp fibres, between 10 and 60 wt. % of filaments and between 0 and 50 wt. % of staple fibres, or, in particular embodiments, between 50 and 75 wt. % of pulp, between 15 and 45 wt. % of filaments and between 3 and 15 wt. % of staple fibres. As a result of the present process, the nonwoven sheet material has few if any deficiencies combined with low residual levels of surfactant of less than 100 ppm, less than 50 ppm, or less than 25 ppm.

The accompanying FIG. 1 shows equipment for carrying out the process described herein. Thermoplastic polymer is fed into a heated drawing device 1 to produce filaments 2, which are deposited on a first running wire 3. A mixing tank 4 has inlets for pulp 5, staple fibre 6, water 7 and air 8, any two of which inlets can be combined. The resulting pulp-containing suspension (foam) 9 is fed to the headbox 10 through inlet 14. Suction boxes 12 below the moving wire remove most of the liquid (and gaseous) residue of the spent pulp-containing suspension, and the resulting aqueous liquid is returned to the mixing tank through lines 13. Pre-integration manifold 15 is fed with fresh water supply 16 and flushes the combined web with jets of water 17 at around 10 bar. The flush water is collected below the wire in box 18 and carried off through line 24. All or part of the spent water can be fed to the mixer 4 to compensate water loss in the foam cycle 9-13. The combined, pre-integrated pulp-polymer web 19 is transferred to a second running wire 20 and subjected to hydroentanglement generators 21 producing multiple hydro-entanglement jets 22, with water discharges 23. The hydroentangled web 29 is then dried in drier 30 and the dried web 31 is further processed (not shown).

Figure 2:
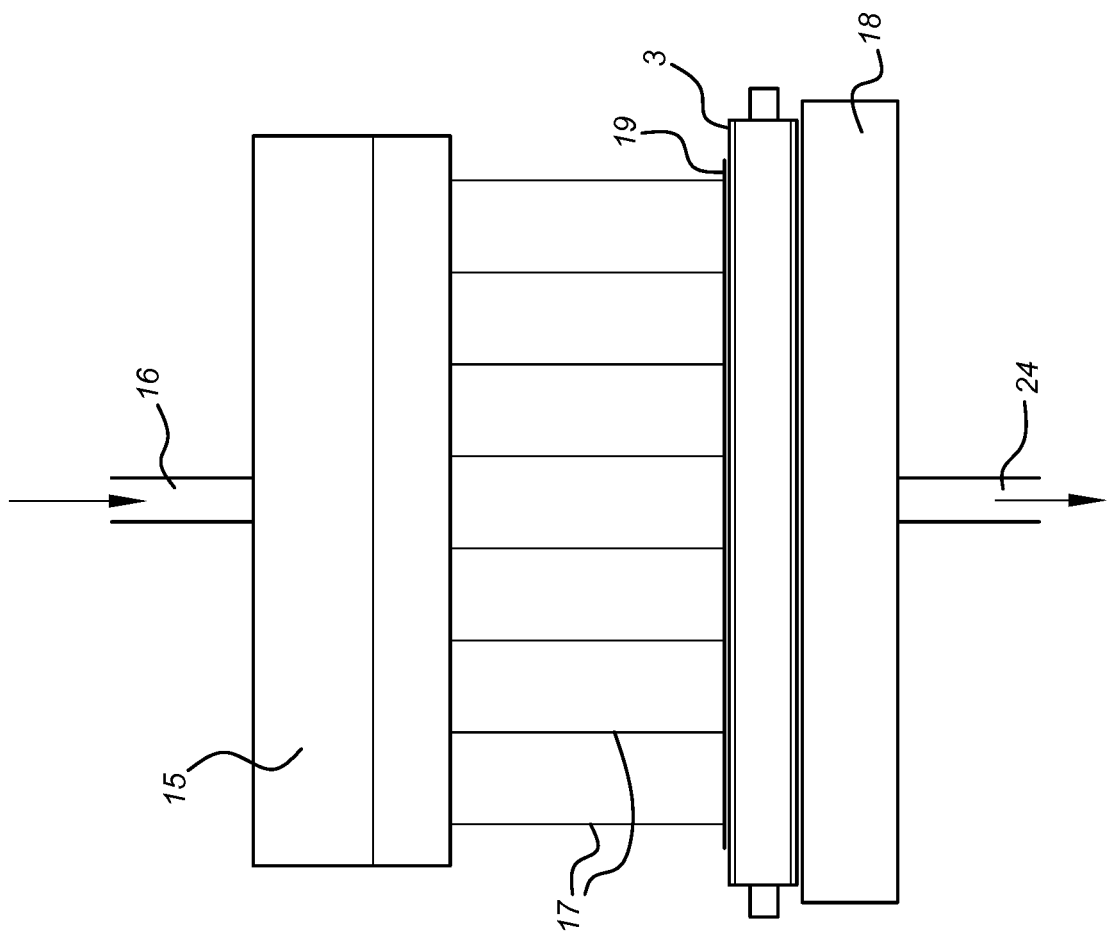

FIG. 2 shows the pre-integration equipment in a view along the moving belt. Same parts have same numbers as in FIG. 1.

The Figures only serve to illustrate an embodiment of the invention and do not limit the claimed invention in any way. The same applies to the Examples below.

Examples and Test Methods

Test methods used for determining properties and parameters of the nonwoven material as described herein will now be explained in more detail. Also a test method for measuring air content of the three-phase foam-forming suspension is presented.

Furthermore, some examples illustrate advantages of using the method as defined in the appended claims and the product provided by such method are presented below.

Test Method—Thickness

The thickness of a sheet material as described herein can be determined by a test method following the principles of the Standard Test Method for Nonwoven Thickness according to EDANA, WSP 120.6.R4 (12). An apparatus in accordance with the standard is available from IM TEKNIK AB, Sweden, the apparatus having a Micrometer available from Mitutoyo Corp, Japan (model ID U-1025). The sheet of material to be measured is cut into a piece of 200×200 mm and conditioned (23° C., 50% RH, ≥4 hours). The measurement should be performed at the same conditions. During measurement the sheet is placed beneath the pressure foot which is then lowered. The thickness value for the sheet is then read after the pressure value is stabilised. The measurement is made by a precision Micrometer, wherein a distance created by a sample between a fixed reference plate and a parallel pressure foot is measured. The measuring area of the pressure foot is 5×5 cm. The pressure applied is 0.5 kPa during the measurement. Five measurements could be performed on different areas of the cut piece to determine the thickness as an average of the five measurements.

Test Method—Air Content

Equipment

A spiral that is connected to inlet for foam, air or water and a corresponding outlet, the spiral having volume of 2 l. The spiral is placed on a scale/balance.

Calibration

Calibration is done by emptying the spiral by blowing compressed air through it and zero setting value of the scale when it is empty, i.e. only filled with air, which is balanced to the calibrated value of zero (0), i.e. 0 vol-% liquid present in the spiral. The spiral is then filled with water and the weight of this water is determined, which gives the calibrated value of 100, i.e. 100 vol. % of liquid present in the spiral.

Measurement

An emptied spiral is filled with the suspension/foam to be tested and weighed and the weight is linearly correlated to the calibrated 0 and 100 end values representing the volume percentage of liquid present in the spiral. Thus, the measured value corresponds to the percentage of liquid part of the foam. The air content is then calculated as the remaining percentage up to sum up to 100 percentage.

Example 1

An absorbent nonwoven industrial cleaning cloth was produced by laying a web of polypropylene filaments on a first running conveyor fabric and then applying on the polymer web a pulp dispersion containing about 0.5 wt. % of a 88:12 weight ratio of wood pulp and polyester staple fibres, and 0.01-0.1 wt. % of non-ionic surfactant (ethoxylated fatty alcohol) by foam forming in a head box, introducing a total of about 30 vol. % of air (on total foam volume). The foam cycle in the loop was about 4200 mg/min (6.0 $m^3$/min). The width of the freshly wet-laid web was about 1.4 m so, per m width of formed web, the foam cycle was about 3000 kg/min. The weight proportion of the polypropylene filaments was 25 wt. % on dry weight basis of the end product. The amounts were chosen so as to arrive at a basis weight of the end product of 55 $g/m^2$. The combined fibre web was then subjected to pre-integration on the first running conveyor fabric with water jets of 6 bar at a rate of about 34 μl/min, i.e. about 24/min per m width of the formed web. Subsequently, the pre-integrated web was subjected to hydroentanglement on a second running conveyor fabric using multiple water jets at increasing pressures of 40-100 bar and subsequently dried. The speed of wind-up of the dried sheet of 1.3 m width was 225 m/min. The product formed contains very low levels surfactant of 25 ppm or lower.

The invention claimed is:

1. A process of producing a hydroentangled composite nonwoven sheet material of natural and/or manmade fibres, comprising:
   a) providing a three-phase (gas-liquid-solid) suspension containing:
      natural and/or manmade fibres;
      a surfactant in an amount between 0.01 and 0.2 wt. % of three-phase suspension;
      water;
      20-48 vol. % of air,
   b) providing a first moving carrier sieve,
   c) applying the three-phase suspension onto the first moving carrier sieve to produce a fibrous web,
   d) removing an aqueous residue of the three-phase suspension through the first carrier sieve,
   e) recycling the aqueous residue to step a),
   f) pre-integrating the fibrous web by flushing the web with 0.0005-0.05 $m^3$ of water per $m^3$ of applied three-phase suspension, at a pressure of 5-50 bar, collecting flushed water and adding flushed water to recycling step e),
   g) transferring the pre-integrated fibrous web from said first moving carrier sieve to a second moving carrier sieve, said second moving carrier sieve having a porosity which is smaller than the porosity of said first moving carrier sieve,
   h) hydroentangling the fibrous web on said second moving carrier,
      wherein the hydroentangled nonwoven sheet material contains less than 100 ppm of the surfactant.

2. The process according to claim 1, wherein, in step f), the web is flushed with water at a pressure of between 5 and 10 bar.

3. The process according to claim 1, wherein, in step f), the web is flushed with 0.001-0.03 $m^3$ of water per $m^3$ of applied three-phase suspension.

4. The process according to claim 1, wherein pre-integrating and collecting step f) is carried out in at least two stages f1) and f2).

5. The process according to claim 4, wherein flushed water collected from the first stage f1) is added to recycling step e) and at least a part of the flushed water collected from the second or last stage f2) is recycled to pre-integration step f1).

6. The process according to claim 1, wherein the aqueous residue removed in step d) is subjected to water-air separation before being recycled in step e).

7. The process according to claim 1, wherein the surfactant is a non-ionic surfactant.

8. The process according to claim 1, wherein the steps of applying the three-phase suspension in step c) and removing aqueous residue in step d) are carried out in at least two separate stages c1), d1) and c2), d2).

9. The process according to claim 8, wherein the pre-integrating and collecting step f) is carried out after the second or last application and removing stage c2), d2).

10. The process according to claim 8, wherein the first pre-integrating and collecting stage f1) is carried out before the second or last applying and removing stage c2), d2) and the second or last pre-integrating and collecting stage f2) is carried out after the second or last applying and removing stage c2), d2).

11. The process according to claim 1, wherein the three-phase suspension is applied in step c) at a rate of between 2.1 and 6.0 $m^3$/min per m width of formed fibrous web.

12. The process according to claim 1, wherein step b) further comprises laying a polymer web onto the first moving carrier sieve, and in step c) the three-phase suspension is applied onto the polymer web to produce a combined web.

13. The process according to claim 1, wherein the natural and/or manmade fibres in the three-phase suspension comprise fibres having lengths from 1 to 25 mm, and the fibres comprise at least 25 wt. % of cellulosic pulp fibres.

14. The process according to claim 1, wherein the sheet material contains 40-80 wt. % of pulp fibres and 15-60 wt. % of thermoplastic fibres.

15. The process according to claim 1, further comprising step i) of drying the hydroentangled sheet and optional further steps of imprinting, conditioning, dimensioning and packaging the dried sheet to produce a ready-for-use sheet material.

16. The process according to claim 1, wherein, in step f), the web is flushed with 0.002-0.02 $m^3$ of water per $m^3$ of applied three-phase suspension.

17. The process according to claim 1, wherein step b) further comprises laying a polymer web onto the first moving carrier sieve, and in step c) the three-phase suspension is applied onto the polymer web to produce a combined web, wherein the polymer web comprises at least 50 wt. % of synthetic filaments.

18. The process according to claim 1, wherein the natural and/or manmade fibres in the three-phase suspension comprise short fibres having lengths from 1 to 5 mm, and the short fibres comprise at least 25 wt. % of cellulosic pulp fibres.

* * * * *